(12) United States Patent
Kyriazi et al.

(10) Patent No.: US 10,728,433 B2
(45) Date of Patent: Jul. 28, 2020

(54) ADJUSTABLE SMARTPHONE ASSEMBLY FOR AN OPTICAL DEVICE EYEPIECE

(71) Applicant: Skope, LLC, Greenwood Village, CO (US)

(72) Inventors: Photios Nicholas Kyriazi, Greenwood Village, CO (US); Abdulrahman Ahmad F Nashawi, Boulder, CO (US); Khalid Abdullah Algashgari, Boulder, CO (US)

(73) Assignee: SKOPE, LLC, Greenwood Village, CO (US)

( * ) Notice: Subject to any disclaimer, the term of this patent is extended or adjusted under 35 U.S.C. 154(b) by 0 days.

(21) Appl. No.: 16/395,072

(22) Filed: Apr. 25, 2019

(65) Prior Publication Data

US 2019/0335071 A1 Oct. 31, 2019

Related U.S. Application Data

(60) Provisional application No. 62/664,026, filed on Apr. 27, 2018.

(51) Int. Cl.
*G02B 7/00* (2006.01)
*H04N 5/225* (2006.01)
(Continued)

(52) U.S. Cl.
CPC .......... *H04N 5/2254* (2013.01); *F41G 1/46* (2013.01); *G02B 7/02* (2013.01); *G02B 25/001* (2013.01);
(Continued)

(58) Field of Classification Search
CPC .............. H04N 5/2254; H04N 5/4403; H04N 2005/4408; F41G 1/46; G02B 7/02; G02B 25/001
(Continued)

(56) References Cited

U.S. PATENT DOCUMENTS

| 1,162,608 | A | * | 11/1915 | Hohl et al. | ............. | A01K 97/10 |
| | | | | | | 248/514 |
| 1,674,538 | A | * | 6/1928 | Williams | ................... | B60J 3/02 |
| | | | | | | 248/279.1 |

(Continued)

FOREIGN PATENT DOCUMENTS

KR 10-1550682 B1 9/2015

OTHER PUBLICATIONS

Jana Wimmer et al, A Novel Smartphone-Microscope Camera Adapter: An Option for Cytology Consultation in Low-Resource Environments, Journal of the American Society of Cytopathology, vol. 1, Issue 1, Nov. 2012, Houston, TX USA.

(Continued)

*Primary Examiner* — Nkeisha Smith (57) ABSTRACT

An assembly allowing a user to adjust a relative positioning of an imaging portal of a lens attached to an electronic device relative to the viewing portal of a lens of an optical device. The assembly is made up of a planar adjustment unit having multiple plates that frictionally interface with one another such that they allow movement by a user. The components of the planar adjustment unit are held together by at least one elastically deformable element that passes through the channels in the sliding plates of the planar adjustment unit. The at least one elastically deformable element holds the planar adjustment unit together in tension such that the assembled plates may still slide with respect to one another, but remain in place by static friction when not moved by a user. The planar adjustment unit may be further combined with components allowing for three-dimensional adjustment of an imaging portal of a lens attached to an electronic device relative to a viewing portal of a lens of an optical device.

19 Claims, 6 Drawing Sheets

(51) Int. Cl.
*G02B 25/00* (2006.01)
*F41G 1/46* (2006.01)
*H04N 5/44* (2011.01)
*G02B 7/02* (2006.01)

(52) U.S. Cl.
CPC ... *H04N 5/4403* (2013.01); *H04N 2005/4408* (2013.01)

(58) Field of Classification Search
USPC .......... 248/276.1, 279.1, 285.1, 286.1, 287.1
See application file for complete search history.

(56) References Cited

U.S. PATENT DOCUMENTS

| | | | | |
|---|---|---|---|---|
| 4,079,604 | A * | 3/1978 | Anderegg | B60R 11/0205 248/285.1 |
| 4,426,055 | A * | 1/1984 | Reedy | G02B 6/3616 248/184.1 |
| 5,076,680 | A * | 12/1991 | Arjarasumpun | G02B 21/26 356/246 |
| 5,551,658 | A * | 9/1996 | Dittmer | G03B 21/00 248/329 |
| 6,485,144 | B1 * | 11/2002 | Liao | G03B 21/00 348/151 |
| 7,455,273 | B2 * | 11/2008 | Lonnqvist | F16M 11/043 248/317 |
| 7,503,536 | B2 * | 3/2009 | Friederich | F16M 11/043 248/324 |
| 7,758,001 | B2 * | 7/2010 | Bouissiere | F16M 11/041 248/206.5 |
| 8,454,174 | B2 * | 6/2013 | Nakano | F16M 13/02 353/119 |
| 9,989,748 | B1 * | 6/2018 | Cho | G02B 21/0088 |
| 2004/0240962 | A1 * | 12/2004 | Teng | F16B 41/002 411/353 |
| 2007/0034765 | A1 * | 2/2007 | Lo | F04D 19/04 248/343 |
| 2008/0179478 | A1 * | 7/2008 | Lee | B60R 11/00 248/276.1 |
| 2009/0061761 | A1 * | 3/2009 | Yang | H01Q 1/1264 455/3.02 |
| 2012/0320340 | A1 | 12/2012 | Coleman, III | |
| 2013/0016963 | A1 | 1/2013 | Miller | |
| 2013/0100271 | A1 | 4/2013 | Howes | |
| 2014/0226965 | A1 | 8/2014 | Fujikake et al. | |
| 2014/0362283 | A1 | 12/2014 | Coppage et al. | |
| 2015/0036043 | A1 | 2/2015 | Markovic | |
| 2015/0054935 | A1 | 2/2015 | Muramatsu | |
| 2015/0378143 | A1 * | 12/2015 | Auguste | G02B 21/362 359/363 |
| 2016/0051142 | A1 | 2/2016 | Howes | |
| 2018/0252907 | A1 * | 9/2018 | Cho | G02B 21/26 |

OTHER PUBLICATIONS

Ggoss, Universal Camera Phone/Microscope Adapter, Thingiverse, Apr. 23, 2013.
Somak Roy et al, Smartphone adapters for digital photomicrography, Journal of Pathological Informatics, 5:24, Jul. 30, 2014, USA.
Gosky, Gosky Universal Cell Phone Adapter Mount—Compatible with Binocular Monocular Spotting Scope Telescope and Microscope—For Iphone Sony Samsung Moto Etc—Record the Nature of the World.
Aliexpress, Fully Metal Telescope Camera Adapter Smartphone Adapter with 2 Phone Brackets for Microscope Binocular Spotting Scope Monocular.
Aliexpress, Fire Wolf Universal Cell Phone Adapter Mount—Compatible With Binocular Monocular Spotting Scope Telescope and Microscope Adapter.
Amazon, iDu LabCam Microscope Adapter for iPhone 6/6S.
Kickstarter, The Skylight, Nov. 18, 2011-Jan. 2, 2012.
Magnifi, Magnifi2 for iPhone 7 and 8.
Snapzoom, Snapzoom Digiscoping Solutions.
Scopemonkey, ScopeMonkey.

* cited by examiner

FIG. 6

# ADJUSTABLE SMARTPHONE ASSEMBLY FOR AN OPTICAL DEVICE EYEPIECE

CROSS-REFERENCE TO RELATED APPLICATIONS

This application claims the benefit of U.S. Provisional Application No. 62/664,026, filed Apr. 27, 2018, the disclosure of which is hereby incorporated by reference in its entirety.

TECHNICAL FIELD

The present disclosure relates to an assembly for attaching an electronic device to a variety of optical devices equipped with eyepieces.

BACKGROUND

Optical devices including, but not limited to, ophthalmoscopes, rifle scopes, binoculars, rangefinders, microscopes, and telescopes have eyepieces that allow users to look through them, using one or both eyes at a time. These optical devices can be used to view objects that are far away or very small by providing additional viewing information, by enlarging the objects, or by overlaying the viewing field with additional information so that a user may see the objects with greater detail. Some microscopes and telescopes have functionalities to allow integration with computer software that has image- or video-capture capability; however, such devices can be expensive, may require manufacturer support for compatibility with the optical device, and may require the use of a desktop or laptop computer. Furthermore, such computers do not facilitate quick and easy transmission of the captured images and typically require additional proprietary software as well as an internet connection and email capabilities, unlike electronic devices, such as smartphones or tablets, which can operate independently over cellular signals.

BRIEF SUMMARY

The present disclosure is an easy-to-use device that allows a user to attach a camera of an electronic device, such as a small, handheld tablet or smartphone, to a device with a lens, like those seen in a rifle scope or a microscope. For example, some embodiments of the easy-to-use attachment device include a main body, an extender, a planar adjustment unit, a device attachment component, and a clamp. These components can be combined to create an electronic device attachment assembly, additionally comprising an electronic device and the eyepiece of an optical device. When combined in this manner, the electronic device attachment assembly may be used to capture images or videos of the object or objects viewed through the optical device and easily transmit the images or videos using the electronic device. The assembly allows alignment of the viewing portal of the optical device with the imaging portal of the electronic device, allowing the user to capture images of the viewable area through the viewing portal with the imaging portal of the electronic device. In other nonlimiting embodiments, the components of the attachment (e.g., the electronic device holder, the clamp, the extender) may be replaced with similar components of varying shape, size, or design to fit different types of optical devices or electronic devices.

For example, in one embodiment, the user may attach a smartphone equipped with a camera to a microscope eyepiece, capture an image of the object viewed through the microscope, and send the image to another device using cellular data. The device attachment is used to hold the electronic device near the eyepiece, and the device can be adjusted in all directions (e.g., away from or closer to the eyepiece, rotationally, and in all directions by sliding the device around on the mount) to get a clear image of the object viewed with the microscope.

BRIEF DESCRIPTION OF THE DRAWINGS

Corresponding reference characters indicate corresponding parts throughout the several views.

Specific embodiments are shown by way of example in the drawings and are described in detail below. The intention, however, is not to limit the disclosure to the particular embodiments described or shown. The disclosure is intended to cover modifications, equivalents, and alternatives falling within the scope of the invention as defined by the claims.

DETAILED DESCRIPTION

All illustrations of the drawings are for the purpose of describing selected embodiments and are not intended to limit the scope of the claims. The following specification describes an attachment for aligning electronic devices with optical devices equipped with eyepieces to allow a user to take pictures and video, which the user can easily send using wireless internet or cellular data networks.

The attachment is made up of various components and may be made from plastic, metal, rubber, or any combination thereof. A main body 101 forms the basic structure for the attachment, and houses an extender 102, which terminates in clamp 103. The main body 101 also forms the base for a planar adjustment unit 104, which includes an attachment of (e.g., by screws, pins, adhesive, and the like) the planar adjustment unit 104 to the main body 101. A device holder 105a attaches the planar adjustment unit 104 using a device holder attachment 105a to join an electronic device 106 to the rest of the attachment.

The electronic device 106 may be any type of electronic device that has camera functionality and wireless internet and/or cellular data capabilities. For example, the electronic device 106 could be a cellular phone, an electronic tablet, a music-playing and storage device, an electronic camera, or any other similar device.

The main body 101 of the attachment is configured to house the body of the extender 102, which can be adjusted in any direction in relation to the main body 101. The extender 102 can be adjusted to move the main body 101 closer or farther away from an eyepiece 107 of an optical device 108 to which the clamp 103 is attached. In one embodiment, the planar adjustment unit 104 is attached to main body 101 by an attachment (e.g., screws, pegs, pins, adhesive, and the like) at a second sliding plate 111, which is adjacent to a second anchor plate 112. A first sliding plate 109 is additionally provided so as to be adjacent to a first anchor plate 110. The first sliding plate 109 is adjacent to a second sliding plate 111. At least one elastically deformable element 113 is attached to the first anchor plate 110, extending through the first sliding plate 109 and second sliding plate 111 via a first channel 114 in the first sliding plate 109, and a second channel 115 in the second sliding plate 111. In one embodiment, the first sliding plate 109 is arranged such that the first channel 114 is perpendicular to the second channel 115 in the second sliding plate 111. The elastically deformable element 113 is additionally attached to second anchor plate 112. The elastically deformable element 113 is in tension, exerting a force between the first anchor plate 110 and the second anchor plate 112. In one embodiment, this tension creates additional friction force between each plate element, which allows movement of the first anchor plate 110, the first sliding plate 109, the second sliding plate 111, and the second anchor plate 112 with respect to one another when a force is applied by the user, but prevents free motion of the planar adjustment unit 104 when said user force is removed.

In one embodiment, the elastically deformable element 113 could be a spring, a rubber band, a flexible connector, or any other similar flexible and resilient member. Furthermore, the device holder attachment 105a is adjacent to second anchor plate 112; the electronic device 106 is held in place by said device holder 105. This elastically deformable element 113 allows rotation of the electronic device 106 while attached to the planar adjustment unit 104.

In another embodiment, the position of the electronic device 106 can be adjusted in a multitude of ways. For example, the main body 101 of the attachment can be adjusted by moving the main body 101 with respect to the extender 102 or moving the main body 101 either towards or away from the clamp 103. Further, the electronic device 106 can be adjusted by moving the components of the planar adjustment unit 104 with respect to one another, wherein the user holds the electronic device 106 and adjusts its position by moving the electronic device 106, while it is retained in the device holder 105, causing the first sliding plate 109, second sliding plate 111, first anchor plate 110, and second anchor plate 112, to slide with respect to one another. Such movement of the first sliding plate 109, second sliding plate 111, first anchor plate 110, and second anchor plate 112 allows the device holder 105, with the electronic device 106, to move easily with respect to the eyepiece 107 of the optical device 108. Such adjustment of the electronic device 106 does not require the user to loosen any fasteners (e.g., a screw, a lever, a button, or similar mechanical fastener) to change the position of the device. Additionally, adjustments can be made fluidly and continuously if the user desires to get different views during a video or a when taking a multitude of pictures. This embodiment further allows for quick transition between devices, wherein the main body 101 may be detachable from a first extender 102 and may be reattached to additional extenders 102 attached to different optical devices 108. In another embodiment, the clamp 103 can be adjusted along the length of the eyepiece 107 of the optical device 108 to move the entire assembly 100 closer or farther away from the lens of the eyepiece 107. All such movements of the assembly 100 allow the user to better align the viewing portal of the optical device 108 with the imaging portal of the electronic device 106. In other words, the adjustments allowed by the assembly 100 maximize the ability of the user to achieve the best view through the eyepiece 107 of the optical device 108 by allowing the user to maneuver the camera of the electronic device 106 to optimally align the viewing portal of the optical device 108 with the imaging portal of the electronic device 106, or the camera lens of the electronic device 106. Further, adjustment of the assembly 100 allows the user to change the amount of the viewing portal of the optical device 108 with the imaging portal of the electronic device 106, allowing the user to take an image of a larger portion of the viewing portal of the optical device 108.

In another embodiment, the clamp 103 is formed separately from the extender 102 and can be changed out by the user for differently sized clamps 103 to fit different eyepieces 107 of different optical devices 108. In another embodiment, the clamp 103 is formed integrally with the extender 102, and can be changed out by substituting an alternate extender 102 with a different clamp 103, to fit different optical devices 108, such as when the diameter of the eyepiece 107 is larger or non-circular, or when a differently sized extender 102 is desired (e.g., if a longer extender 102 arm is desired).

The planar adjustment unit 104 is comprised of a plurality of plates: the first anchor plate 110 has a first top surface 110a and a first bottom surface 110b; the first sliding plate 109 has a second top surface 109a and a second bottom surface 109b; the second sliding plate 111 has a third top surface 111a and a third bottom surface 111b; and the second anchor plate 112 has a fourth top surface 112a and a fourth bottom surface 112b. The first bottom surface 110b contacts the second top surface 109a, the second bottom surface 109b contacts the third top surface 111a, the third bottom surface 111b contacts the fourth top surface 112a. The at least one elastically deformable element 113 is attached at a first end 113a to the first anchor plate 110, and at a second end 113b to the second anchor plate 112. The first sliding plate 109 is arranged relative to the second sliding plate 111 such that the first channel 114 extends in a different direction than the second channel 115. In some embodiments, the first channel 114 and the second channel 115 are perpendicular with respect to one another.

In some embodiments, there is a third channel 201 in the first sliding plate 109, and a fourth channel 202 in the second sliding plate 111. Further, a second elastically deformable element 213 passes through the first channel 114 in the first sliding plate 109 and the fourth channel 202 in the second sliding plate 111. A third elastically deformable element 214 passes through the third channel 201 in the first sliding plate 109 and the second channel 115 in the second sliding plate 111. A fourth elastically deformable element 215 passes through the third channel 201 in the first sliding plate 109 and the fourth channel 202 in the second sliding plate 111.

Figure 1:
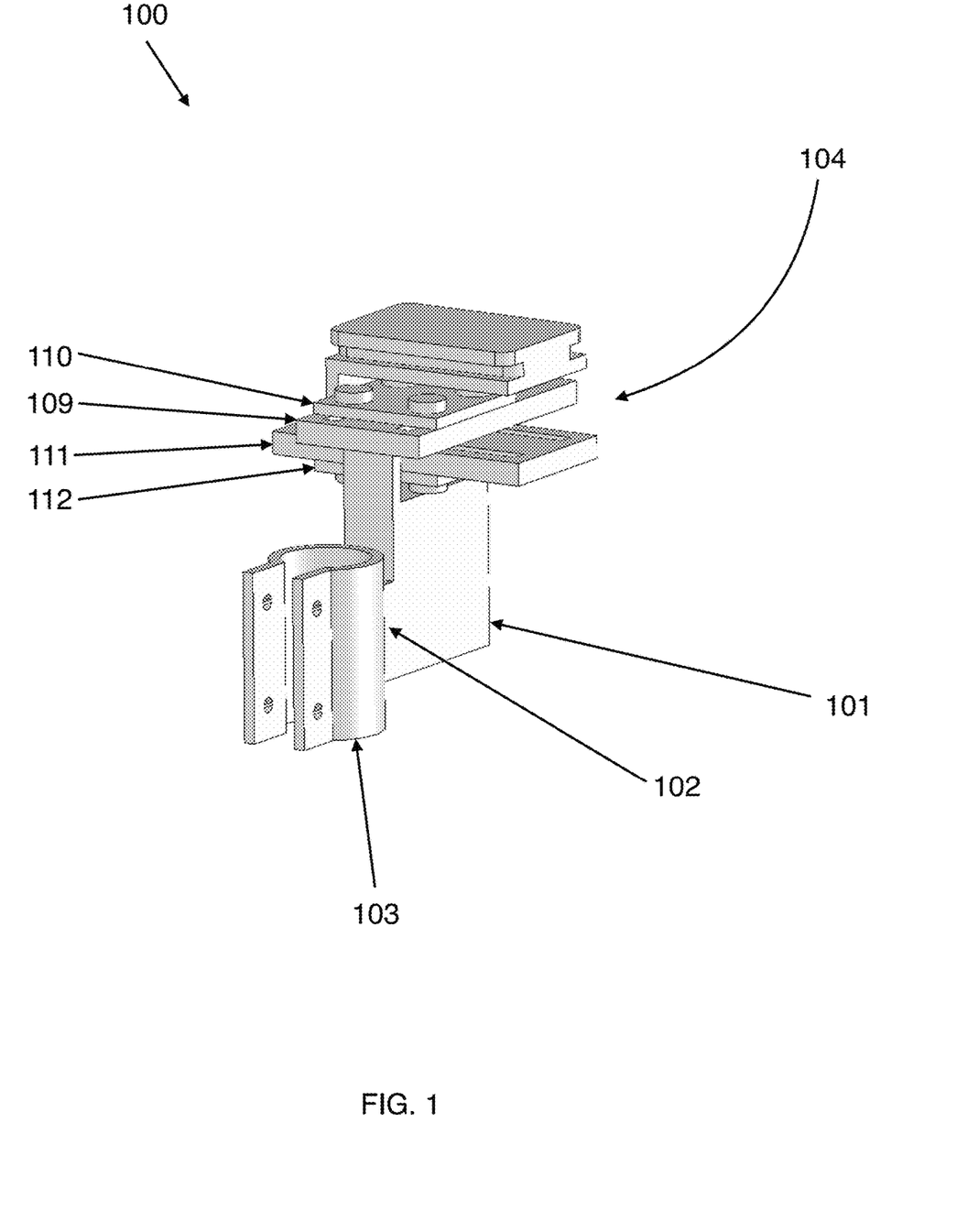
FIG. 1 is a perspective view of the assembly, according to an embodiment of the present disclosure.

FIG. 1 is a perspective view of one embodiment of the present disclosure. The assembly 100 has main body 101, which supports the planar adjustment unit 104. The main body 101 is attached to the planar adjustment unit 104 by an attachment (e.g., a screw, a peg, a pin, or other similar connector) at the second sliding plate 111. Adjacent to the second sliding plate 111 is a first sliding plate 109, which is further adjacent to a first anchor plate 110. The second sliding plate 111 is also adjacent to a second anchor plate 112. Additionally, there is a clamp 103, attached to an extender 102, which can, in some embodiments, be attached to the main body 101 to couple the main body 101, and therefore the planar adjustment unit 104, to an optical device 108 (see FIG. 6).

Figure 2:
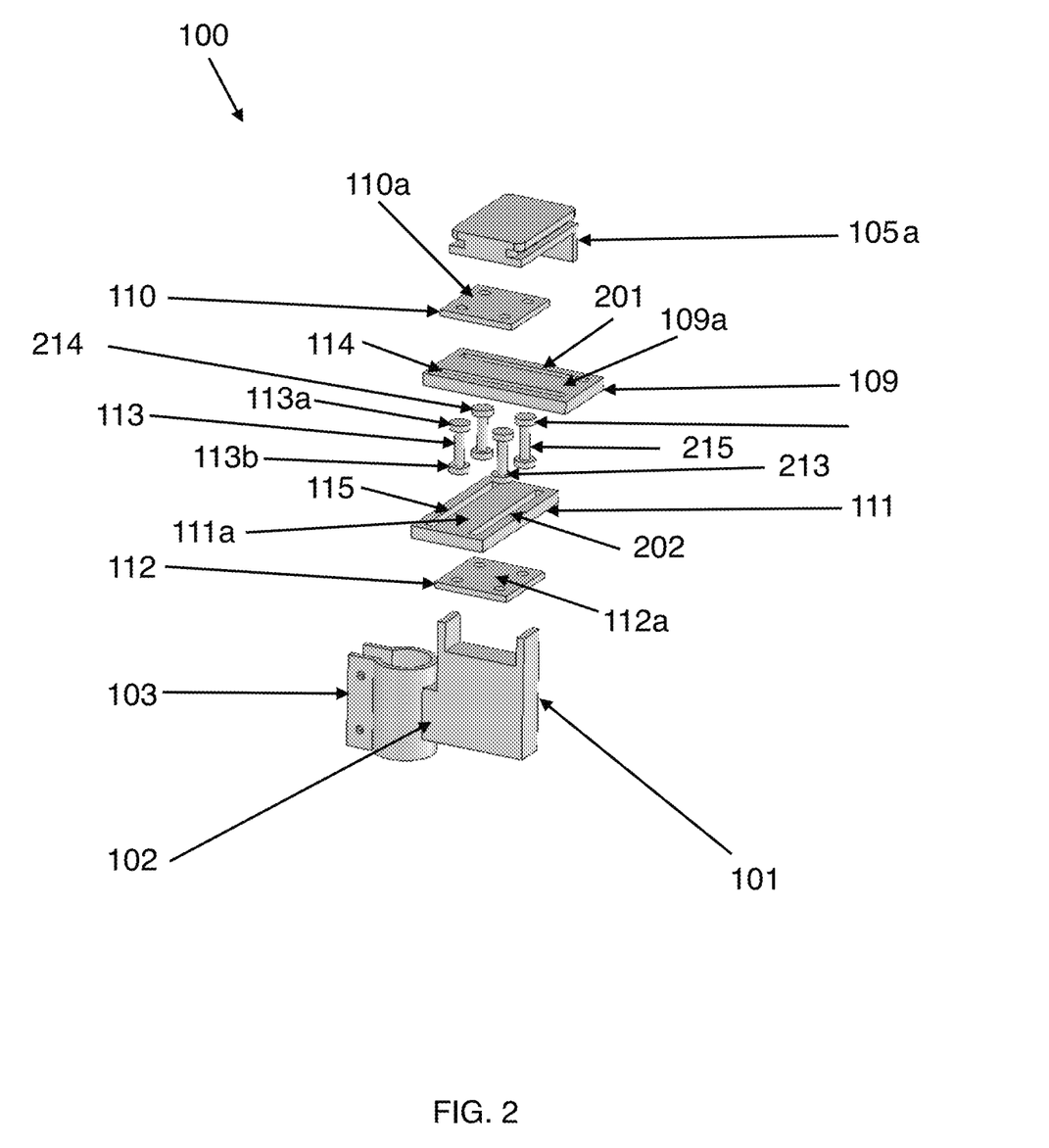
FIG. 2 is an exploded view of the assembly, with first and second anchor plates, according to an embodiment of the present disclosure.

FIG. 2 is an exploded view of one embodiment of the present disclosure. The assembly 100 is comprised of a device holder attachment 105*a*, which is attached to the first sliding plate 109 by an attachment (e.g., a screw, a pin, a peg, adhesive, or other similar attachment) or could, in some embodiments, be integrally formed with the first sliding plate 109. In some embodiments, there is a first anchor plate 110 in between the device holder attachment 105*a* and the first sliding plate 109. The first sliding plate 109 has a second top surface 109*a* and a second bottom surface 109*b*. A second sliding plate 111, having a third top surface 111*a* and a third bottom surface 111*b*, is adjacent to the first sliding plate 109, wherein the third top surface 111*a* is adjacent to the second bottom surface 109*b*. A second anchor plate 112, having a fourth top surface 112*a* and a fourth bottom surface 112*b*, is adjacent to the second sliding plate 111, wherein the third bottom surface 111*b* of the second sliding plate 111 is adjacent to the fourth top surface 112*a* of the second anchor plate 112. The main body 101 is attached to the second anchor plate 112, by an attachment (e.g., at least one screw, pin, peg, other similar fastener, or by adhesive), or could be integrally formed as a single construction. There is a clamp 103 that is attached to an extender 102, which can, in some embodiments, move with respect to the main body 101. In the first sliding plate 109, there is a first channel 114. There is also a second channel 115 in the second sliding plate 111. Additionally, the assembly 100 also comprises at least one elastically deformable element 113, which can, in some embodiments, be a spring, rubber band, deformable peg, or another elastic, resilient element that is stretched when a load is applied and will return to its original, unstretched length when the load is removed. In one embodiment, the first sliding plate 109 is arranged with respect to the second sliding plate 111 such that the first channel 114 is perpendicular to the second channel 115, and the elastically deformable element 113 runs through the first channel 114 and the second channel 115. The elastically deformable element 113 is attached at one end to the first anchor plate 110 and at the other end to the second anchor plate 112.

Figure 3:
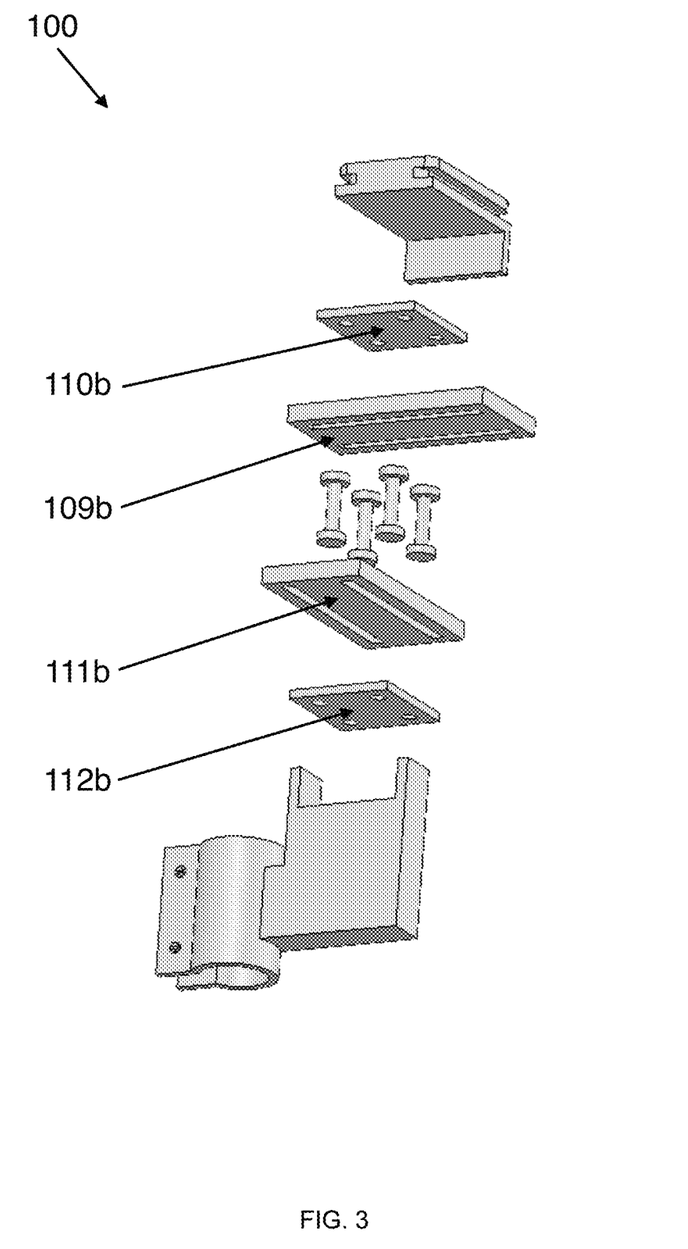
FIG. 3 is an exploded view of the assembly, with first and second anchor plates, according to an embodiment of the present disclosure.

FIG. 3 is a view of an embodiment of the assembly 100 from a lower view. The view illustrates the first bottom surface 110*b*, second bottom surface 109*b*, third bottom surface 111*b*, and fourth bottom surface 112*b*.

Figure 4:
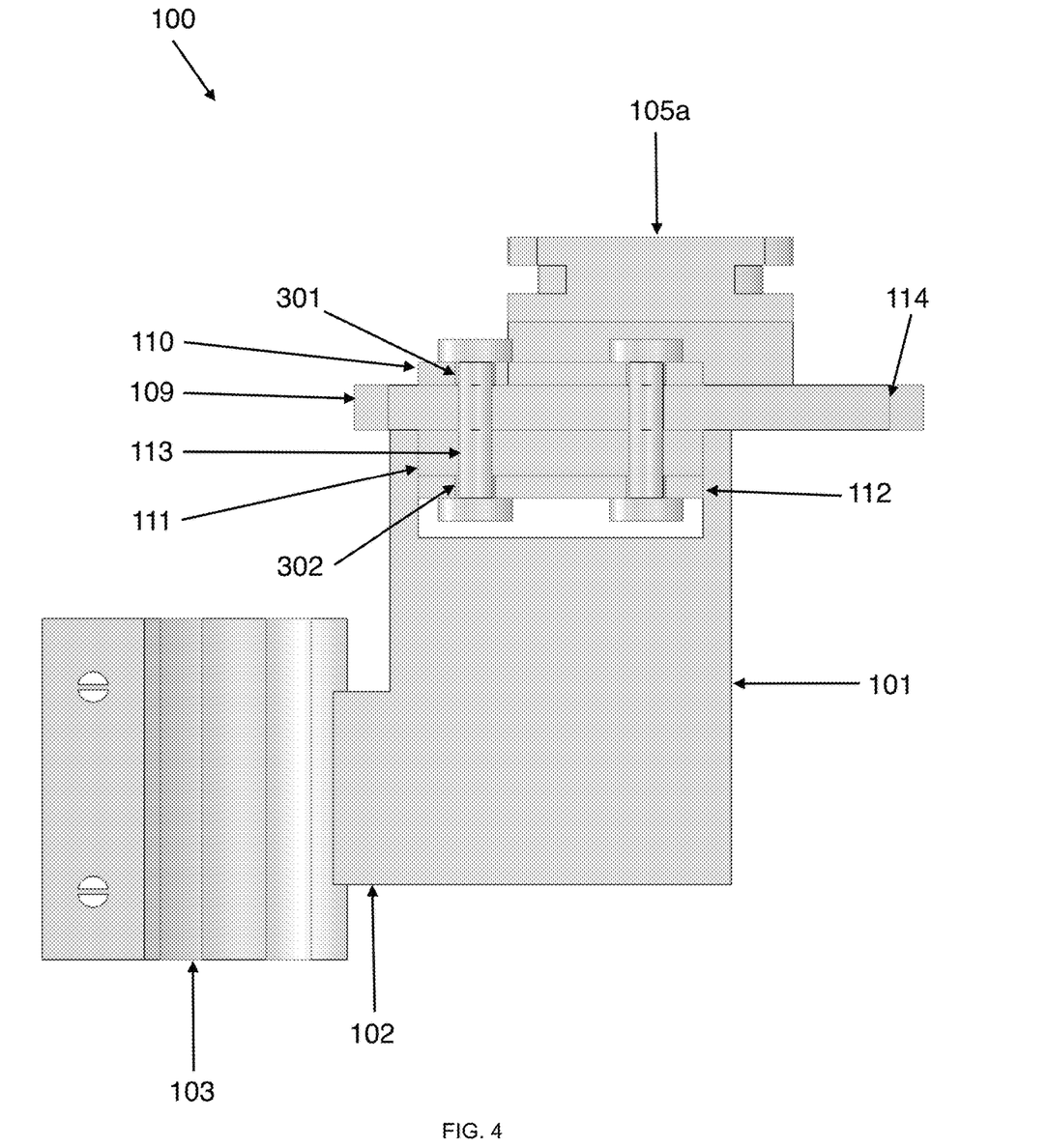
FIG. 4 is a cross-sectional view of the assembly, illustrating the components of the assembly according to an embodiment of the present disclosure.

FIG. 4 is a cross-sectional view of the assembly 100 in one embodiment. In the embodiment, the elastically deformable element 113 is attached to the first anchor plate 110 and second anchor plate 112. In the embodiment, the elastically deformable element passes through an aperture 301 in the first anchor plate 110, through the first channel 114 in the first sliding plate 109, through the second channel 115 (see FIG. 2) in the second sliding plate 111, and through another aperture 302 in the second anchor plate 112.

Figure 5:
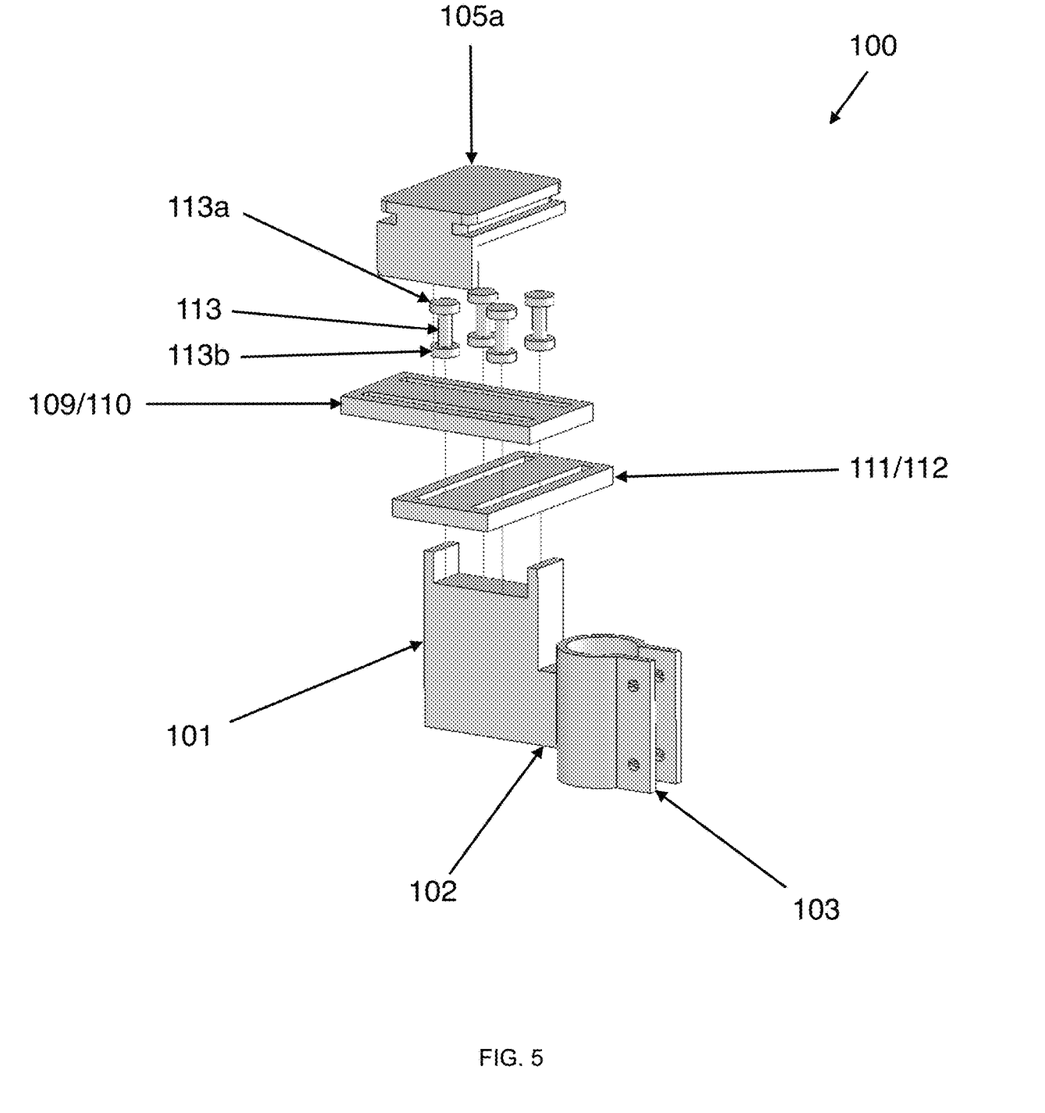
FIG. 5 is an exploded view of the assembly, wherein the first anchor plate and the first sliding plate are the same, and the second anchor plate and the second sliding plate are the same, according to an embodiment of the present disclosure.

FIG. 5 is an exploded view of one embodiment of the present disclosure. In the embodiment, the first anchor plate 110 and the first sliding plate 109 are the same plate and are not required to be physically separate components. In this embodiment, the second top surface 109*a* is adjacent to the device holder attachment 105*a*, and the second bottom surface 109*b* is adjacent to the third top surface 111*a* of the second sliding plate 111. Furthermore, in the embodiment, the second anchor plate 112 and the second sliding plate 111 are also not physically separate components and are, instead, the same plate. In the embodiment, the elastically deformable element 113 is attached to the first sliding plate 109 and the second sliding plate 111, wherein the first sliding plate 109 is both the first sliding plate 109 and the first anchor plate 110, and further wherein the second sliding plate 111 is both the second sliding plate 111 and the second anchor plate 112. The elastically deformable element 113 passes through the first sliding plate 109 and through the second sliding plate 111, and is attached at a first end 113*a* to the first sliding plate 109 and at a second end 113*b* to the second sliding plate 111.

Figure 6:
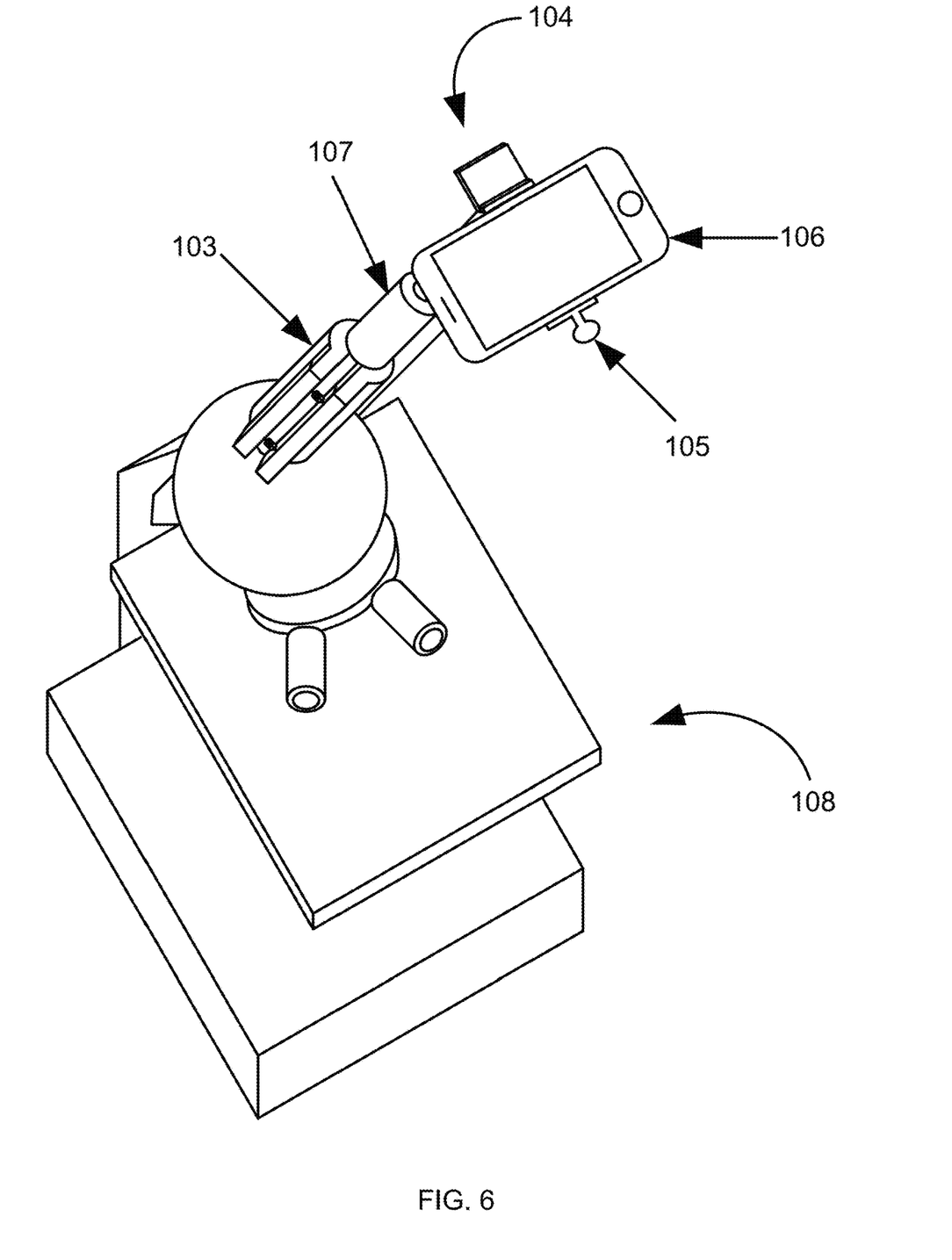
FIG. 6 is a perspective view of the assembly attached to a microscope, according to an embodiment of the present disclosure.

FIG. 6 is an illustration of the assembly in use with an optical device 108, which in this illustration is a microscope for purposes of example only. The planar adjustment unit 104 is attached to the optical device 108, specifically to the eyepiece 107 of the optical device 108. The assembly is attached to the eyepiece 107 by the clamp 103, which attaches to the eyepiece 107 of the optical device 108. The planar adjustment unit 104 is further attached to the device holder attachment 105*a* (see FIG. 5), onto which the device holder 105 slides. The device holder 105 adjusts to fit the electronic device 106, which in the shown embodiment is a smartphone.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

What is claimed is:

1. An assembly for adjustably aligning a viewing portal of an optical device with an imaging portal of a handheld electronic device comprising:
    a planar adjustment unit, comprising:
        a first anchor plate having a first top surface and a first bottom surface;
        a first sliding plate having a first channel that extends in a first direction at least a partial length of the first sliding plate, the first sliding plate further having a second top surface and a second bottom surface, and wherein the second top surface contacts the first bottom surface;
        a second sliding plate having a second channel that extends in a second direction at least a partial length of the second sliding plate, the second sliding plate further having a third top surface and a third bottom surface, and wherein the third top surface contacts the second bottom surface;
        a second anchor plate, having a fourth top surface, wherein the fourth top surface contacts the third bottom surface; and
        at least one elastically deformable element, with a first end that is coupled with the first anchor plate, and a second end that is coupled to the second anchor plate, wherein the elastically deformable element passes through the first channel and the second channel, and the elastically deformable element is in tension; and
    an adjustable holder attached to the first top surface, configured to secure the handheld electronic device.

2. The assembly of claim 1, wherein the first anchor plate and the first sliding plate comprise a first plate, and further wherein the second anchor plate and the second sliding plate comprise a second plate.

3. The assembly of claim 1, wherein the first and second directions of the first and second channels are different.

4. The assembly of claim 3, wherein the first direction of the first channel is perpendicular to the second direction of the second channel.

5. The assembly of claim 4, wherein the first sliding plate further comprises a third channel, and the second sliding plate further comprises a fourth channel.

6. The assembly of claim 5, wherein a second elastically deformable element passes through the first and fourth channels, a third elastically deformable element passes through the second and third, channels, and a fourth elastically deformable element passes through the third and fourth channels.

7. The assembly of claim 1, wherein the second sliding plate is mounted to a main body.

8. The assembly of claim 7, wherein the main body is shaped to receive an extender with a clamp on a distal end shaped to attach to the eyepiece of the optical device.

9. The assembly of claim 8, wherein the clamp is made of an elastically resilient material.

10. The assembly of claim 1, wherein:

the planar adjustment unit is manipulated through application of a force, thereby sliding one of the first sliding plate, second plate, first anchor plate, or second anchor plate with respect to at least one of the first sliding plate, second plate, first anchor plate, or second anchor plate;

wherein coupling the handheld electronic device with the first anchor plate exerts a sliding force on the first sliding plate; and wherein the first sliding plate is coupled with the second sliding plate, such that a tension force of the elastically deformable element plus a frictional force between the first and second sliding plates is sufficient to overcome the sliding force to maintain the first and second sliding plates in a fixed relative position.

11. An assembly for adjustably aligning a viewing portal of an optical device with an imaging portal of a handheld electronic device, comprising:

a main body configured to removably attach to an eyepiece of the optical device;

a first sliding plate having a bottom surface;

a second sliding plate fixed with respect to the main body and having a top surface that contacts the bottom surface of the first sliding plate;

an elastically deformable element that couples the first sliding plate with the second sliding plate such that the first sliding plate is configured to move along the top surface of the second sliding plate, wherein the elastically deformable element is in tension and increases a frictional force between the top surface and the bottom surface; and an electronic device holder coupled with the first sliding plate, wherein the electronic device holder is configured to secure the handheld electronic device.

12. The assembly of claim 11, further comprising a clamp connected to the main body configured to removably attach the main body to the eyepiece of the optical device.

13. The clamp of claim 12, wherein the clamp is further configured to allow movement along a length of the eyepiece of the optical device.

14. The clamp of claim 12, wherein the clamp can be changed out to fit different eyepieces of different optical devices.

15. The assembly of claim 11, further comprising an extender that connects the clamp to the main body.

16. The assembly of claim 11, wherein the first sliding plate has at least a first channel with a first direction and the second sliding plate has a least a second channel with a second direction.

17. The assembly of claim 11, wherein the first and second directions of the first and second channels are different.

18. The assembly of claim 11, wherein the first direction of the first channel is perpendicular to the second direction of the second channel.

19. The assembly of claim 11, wherein the elastically deformable element is configured to allow rotation of the electronic device holder.

* * * * *